INVENTORS
ALLAN M. JOHNSON
RICHARD F. GILMAN
BY
R. E. Geauque
ATTORNEY

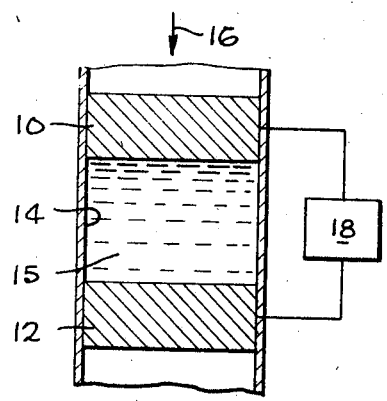
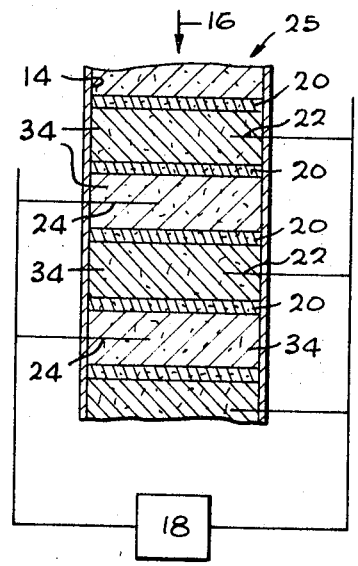
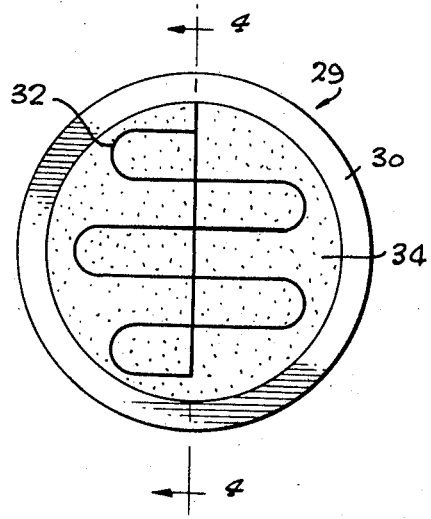
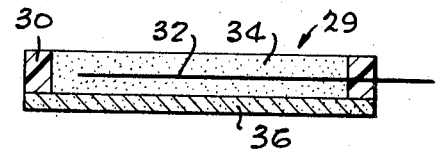

United States Patent Office 3,515,664
Patented June 2, 1970

3,515,664
DEMINERALIZING PROCESS AND APPARATUS
Allan M. Johnson, 7423 Balcolm Ave., Reseda, Calif. 91335, and Richard F. Gilman, 768 Erringer Road, Simi, Calif. 93065
Filed Jan. 17, 1967, Ser. No. 609,825
Int. Cl. B01d *13/00, 13/02*
U.S. Cl. 204—301                                         8 Claims

ABSTRACT OF THE DISCLOSURE

Anion responsive and cation responsive electrodes are located alternately in a flow path and adjacent electrodes are separated by a porous separator layer. The electrodes and separators are both permeable to fluid flow so that the electrolyte fluid can flow through the electrodes. A D.C. source has its positive and negative sides connected to alternate ones of the electrodes and the separator insulates adjacent electrodes from one another. Each of the electrodes is formed of unconsolidated carbon particles, some being treated with a cation responsive material in fluid form which is later polymerized and others of the electrodes being treated with an anion conducting material in fluid form which is later polymerized. The polarity of the D.C. source and the direction of fluid flow is reversible.

---

This invention relates to a process and apparatus for desalting or demineralizing a fluid such as salt water, and more particularly, to such a process and apparatus that is based on electrolytic principles and employs reversible electrodes.

One of the major problems of interest to the world at the present time is that of removing the salt from sea water and making the water usable for human consumption. Thus far, no practical method of accomplishing this has been developed. Various solutions have been proposed, but none has been entirely satisfactory. The present invention approaches the solution of the problem from an entirely different direction than prior attempts and is based on a regenerative electrolytic process.

The present invention utilizes two electrodes, one of which is specially treated to accept anions from an electrolyte and the other of which is treated to accept cations from the electrolyte. As is well known, an anion is a negatively charged ion, and a cation is a positively charged ion. Salt, of course, is comprised of sodium and chlorine atoms, which (in solution) are ionized and can be attracted to one or the other of the two electrodes, as salt water passes along a flow path in which the electrodes are located. To make the apparatus more efficient, a stack of electrodes may be used, with alternate electrodes being positively and negatively charged.

Eventually, the concentration of sodium ($Na^+$) and chlorine ($Cl^-$) ions on the electrodes will decrease the efficiency of the apparatus to a point where insufficient salt is being removed from the electrolyte. At that time, the polarities of the electrodes are reversed. The Na and Cl ions, which have been deposited on the electrodes, then re-combine to form NaCl (salt). The salt can then be flushed from the apparatus, and the process repeated.

In another embodiment of the invention, means are provided for reversing the flow of electrolyte in the flow path when the polarities of the electrodes are reversed, thus preventing the waste of the electrolyte that is in the flow path between the electrodes when current flow is reversed.

In a third embodiment, desalting of the electrolyte is accomplished in a plurality of sequential steps. A plurality of reservoirs are employed, the reservoirs being filled with solutions of different degrees of salinity. The least saline fluid is first further desalted until the desalting rate reaches an unaccepted minimum, at which time the next most saline solution is desalted and the product of the process routed to that reservoir that formerly contained the least saline solution. The process proceeds sequentially until the apparatus becomes saturated with salt, at which time the regenerative process can begin.

The invention, together with additional features and advantages thereof, can be better understood from the following description, taken in conjunction with the accompanying drawings, in which:

FIG. 1 is a diagram illustrating the basic principle of operation of the invention;

FIG. 2 is a diagram showing how a plurality of electrodes can be assembled in a fluid flow path;

FIG. 3 is a plan view of a typical electrode;

FIG. 4 is a cross-sectional view of the electrode taken on the line 4—4 of FIG. 3;

Figure 5:
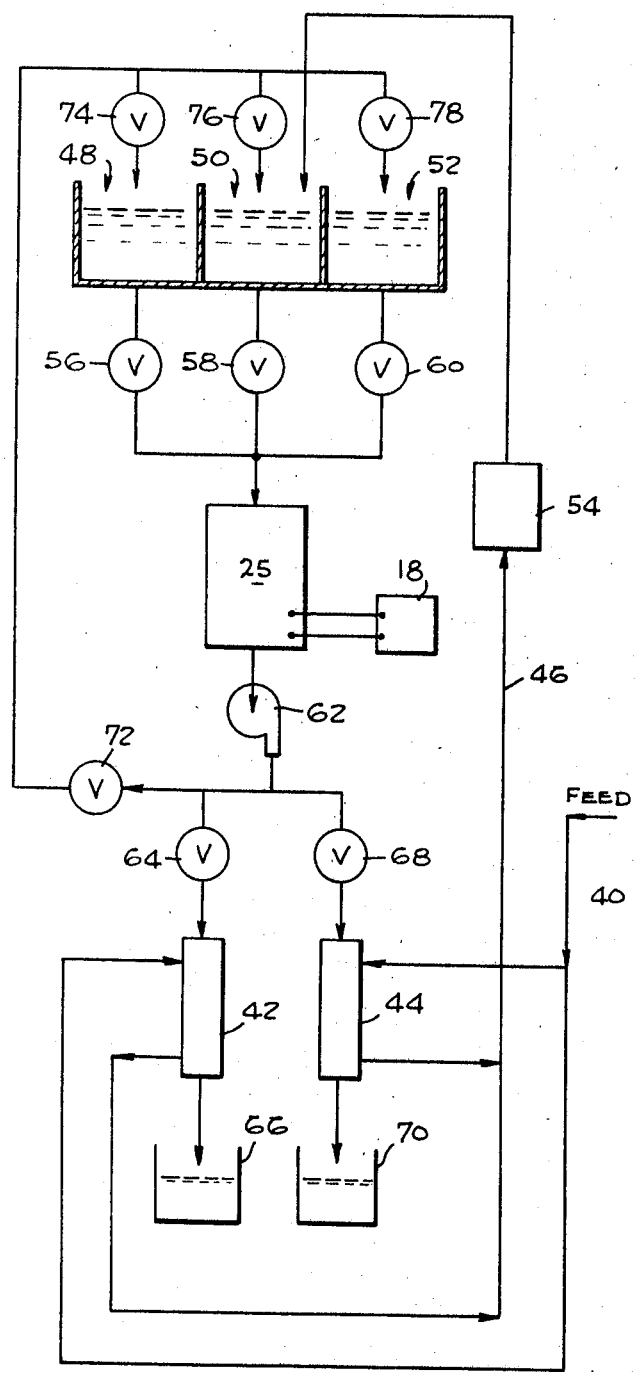
FIG. 5 is a diagram showing a second embodiment of the invention.

FIG. 1 illustrates a basic form of the invention comprising an anion responsive (or collecting) electrode 10 and a cation responsive (or collecting) electrode 12 located in a fluid flow path, such as conduit 14. The electrodes 10 and 12 are permeable to a fluid electrolyte 15 flowing through the conduit in, for example, the direction of the arrow 16, although the fluid may flow in the reverse direction. The electrodes 10 and 12 are oppositely charged from reversible source of direct current (D.C.) 18.

In the particular example shown for purposes of explanation, it is assumed that the electrode 10 is anion responsive and with the adsorption of anions from the electrolyte flowing through the conduit 14 simultaneously releases electrons through the external circuit into the source 18. In a similar manner, the electrode 12 is cation responsive, and accepts cations from the electrolyte with the simultaneous acceptance of electrons from the source 18. Thus, both the anions and cations are neutralized and remain as uncharged atoms on the electrodes 10 and 12.

It is pointed out that the chemical treatment given the respective electrodes is different, so that one electrode contains "weak cations" and the other contains "weak anions." The concept of a "weak ion" here refers to a chemical group, which can be either ionic or covalent in nature with the normal equilibrium condition being predominantly covalent. The ability of the system to respond to the electrical forces is coupled to the response of the ionic-covalent equilibrium to the electrical environment. The weak electrolyte can buffer the electrode against deleterious pH changes.

Eventually, due to the collection of Na and Cl atoms on the electrodes, the efficiency of the process decreases to an unacceptable point. At that time, the polarity of the D.C. source 18 is reversed, thus making the electrode 10 negative and the electrode 12 positive. This causes the atoms on the electrodes 10 and 12 to be released. When the anions and cations are released into the electrolyte between the two electrodes 10 and 12, they re-combine to form salt, which can then be flushed out of the conduit 14 as waste material, and the desalting cycle repeated. It makes no difference which electrode is positively charged or which is negatively charged, so long as their polarities can be reversed periodically to cause the removal of material collected thereon.

FIG. 2 illustrates how a plurality of electrodes can be assembled in the fluid flow path or conduit 14. It is pointed out that several of the elements to be hereinafter described with reference to FIG. 2 and shown as separate elements can be combined into a single unit, as will be described with reference to FIGS. 3 and 4.

As shown in FIG. 2, each of a plurality of electrodes 22 and 24 includes a porous separator 20. Flow of the liquid electrolyte may be either upwardly or downwardly, as seen in FIG. 2. All of the electrodes 22 are connected to the same side of the D.C. source 18, so that they all have the same potential; similarly, all of the electrodes 24 are connected to the other side of the source. Thus, alternate electrodes are of opposite polarities and comprise a "stack" 25 of electrodes 22 and 24, which acts as a series arrangement of electrodes with respect to water flow, with each adsorbing a portion of the minerals in the electrolyte passing through the conduit 14. As in the embodiment shown in FIG. 1, current flow from the source 18 must be periodically reversed in order to clean off the electrodes 22 and 24 and the conduit 14 must be cleaned out before the desalting process is resumed.

A typical electrode and separator cell structure is shown in FIGS. 3 and 4. As previously noted, both an electrode and a separator can be combined in a single electrode unit 29, one example of which is shown in FIGS. 3 and 4. As shown, the electrode unit 29 comprises a plastic frame 30 which is shown as circular although it may be of any particular shape to fit the conduit 14. Extending into the frame 30, which is made of a non-conducting material such as plastic, is a conductor 32, circuitously extended within the plastic frame 30. Of course, it need take no particular path. The conductor 32 may be made of titanium, graphite, or other material, so long as it is a good conductor of electric current.

The conductor 32 is surrounded on the top and bottom (with respect to the flow path) with an ion-responsive material 34, which will be described hereinafter. The electrode unit 29 is also covered on one side by a porous separator 36, which may advantageously comprise a plastic polyelectrolyte and corresponds to the separator 20 shown in FIG. 20. The efficiency of the stack of electrodes is significantly increased by using such a separator in each unit.

The ion-responsive material 34 of the electrode units, which are to be used in the stack as anodes or cathodes, is differently treated for the two different uses. The anion responsive material (in the normal desalting process) may comprise carbon granules or fibers, which may be treated in the following manner:

(1) Coat the carbon surfaces with an extensive thin coating of styrene polymerized with a small amount of a linking agent such as divinylbenzene;

(2) Swell the plastic film with chloromethyl methyl ether;

(3) Chloromethylate the film using a catalyst such as anhydrous aluminum chloride or, preferably, zirconium tetrachloride which serves functionally as well as catalytically;

(4) React the chloromethylated film with a suitable primary or secondary (but not tertiary) amine such as diethylamine.

Similarly, the cation responsive material may be prepared in the following manner:

Carbon granules or carbon fibers are converted into a "weak acid" ion exchange material. This can be done by partially oxidizing the carbon using concentrated sulfuric or nitric acid. Preferably, however it is done by polymerizing a thin film of suitable resin on the carbon. A suitable resin can be made from a mixture of acrylic acid and divinylbenzene, which is fixed by heating after adsorption on the carbon. By applying said cation and anion responsive materials in fluid form and then effecting their polymerization, the materials are rendered insoluble.

It is again pointed out that it is possible and advantageous to make the side of the porous separator (36 in FIG. 4), which faces each type of electrode (anode or cathode), from a material that possesses the correct ion exchange capability to match that of the ion responsive material 34 within the unit 29.

FIG. 5 diagrammatically illustrates an embodiment of the invention in which desalting or demineralization is accomplished in a plurality of sequential steps. As shown, raw electrolyte is admitted to the apparatus through a line 40 and is routed to regenerative heat exchangers 42 and 44. The fluid discharged from the heat exchangers 42 and 44 is then sent by way of a line 46 to a reservoir 50. There are, in the present example, three reservoirs 48, 50 and 52, although there may be any desired number. The fluid is sent through a heater 54 interposed between the heat exchangers and the reservoir. The three reservoirs 48, 50 and 52 contain electrolyte of different degrees of salinity, with the reservoir 48 having the most saline fluid and the reservoir 52 having the least saline solution.

Before proceeding further with the description of FIG. 5, it is believed appropriate to discuss several of the characteristics of the electrolytic desalting process of the invention. First, the current flowing between anodes and cathodes is high at the start of a desalting cycle, and declines as the salinity of the electrolyte decreases. Also, the current flow and overall electrode effective capacities are dependent on the electrolyte salinity. Second, the current density is high in a through-flow system, such as shown in FIG. 2, due to the high salinity of the electrolyte passing therethrough. The embodiment shown in FIG. 5 avoids these disadvantages.

As shown, the reservoirs 48, 50 and 52 discharge through valves 56, 58 and 60, respectively, into the electrode stack 25. Of course, the reversible D.C. source 18 is connected to the stack 25. The output of the stack 25 is sent to a circulation pump 62, whose output can be routed to a number of different places. It can be sent through a valve 64 to the heat exchanger 42 and thence to a product receiver container 66, or through a valve 68 to the heat exchanger 44 and thence to a waste receiver container 70. Also, the output of the stack 25 can be routed through a valve 72 to any of the reservoirs 48, 50 or 52, which are provided with input valves 74, 76 and 78, respectively.

In steady state operation, raw electrolyte is fed through the heat exchangers 42 and 44 and through the heater 54 to the reservoir 50. The valve 58 is then opened to admit the raw electrolyte to the electrode stack 25. Initially, the current through the stack will be high and thus the rate of desalting is high. The output fluid from the stack 25 is routed through the valves 72 and 78 to the reservoir 52. With the passage of time, the current and desalting rate decrease, and the salinity of the output of the stack increases. The valve 78 can then be closed, and the valve 74 opened to fill the reservoir 48.

When all three reservoirs are filled, the valves 56, 72 and 76 are closed and the electrode stack is regenerated and purged of its raw electrolyte contents. This is done by reversing the polarity of the D.C. source 18 to regenerate the electrodes, and by opening the valve 68 to cause the contents of the stack 25 to be pumped into the waste receiving container 70. When this has been completed, the valve 68 is closed and the process for producing desalted fluid can be started.

When the desalting process is started, the valve 60 is opened to permit fluid to flow from the reservoir 52, which contains fluid having the lowest salinity of the fluid in any of the reservoirs. Because the electrode stack 25 has been freshly regenerated, the current through the stack and the rate of desalting will be initially high. So long as the output fluid from the stack is of a desired quality, it can be routed through the valve 64 to the product receiver container 66.

When the quality of the product falls below the acceptable quality level, the valve 64 is closed, as is the valve 60 from the reservoir 52. The valves 72, 78 and 58 are opened. This causes the fluid in the reservoir 50 to be routed into the electrode stack 25, which fluid is of higher salinity than that in the reservoir 52, and the output stack is routed into reservoir 52. As the higher salinity fluid passes through the stack 25, the current and desalting rate increase to partially desalt the fluid from the reservoir 50.

When the current again falls below the acceptable level, the valves 58 and 78 are closed, and the valves 56 and 76 opened to increase the salinity of the fluid supplied to the electrode stack 25. Thus, once again the current and desalting rate are increased. This process is repeated through reservoirs containing fluid of increasing salinity until the adsorbent stack 25 is saturated with salts, at which time the regenerative process can begin.

At that time, flow into the stack 25 may be stopped and the polarity of the D.C. source reversed. When the salts have been cleaned from the electrodes in the stack, the stack can be sequentially purged by fluid of decreasing salinity from the various reservoirs until it is full of low salinity fluid, when the desalting process can be repeated.

The heat exchangers 42 and 44 and the heater 54 are optional features in the system shown in FIG. 5. However, because the overall process is temperature-dependent, their use may be justified in certain applications. The process is temperature-dependent because the electrical conductivity of the electrolyte in the stack is increased by elevated temperature, and because chemical electrode processes are involved, the rates of which are also favored by high temperature.

Figure 6:
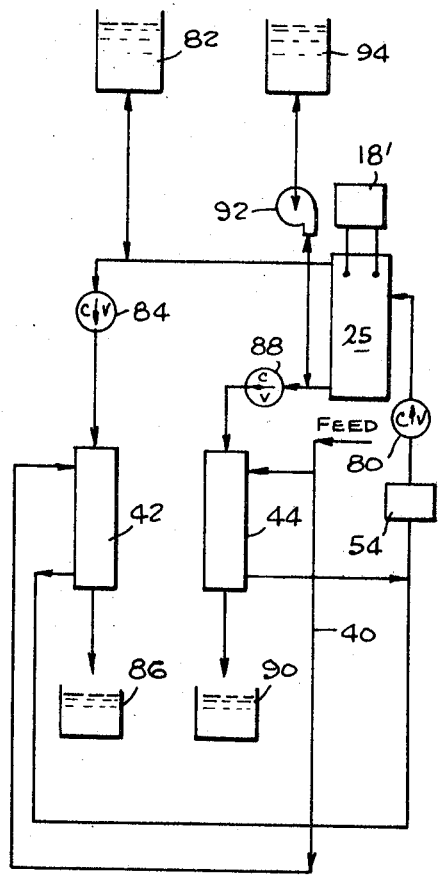
FIG. 6 is a diagram of a third embodiment of the invention.

FIG. 6 illustrates another embodiment of the invention, wherein raw electrolyte is fed through the conduit 40 to the two heat exchangers 42 and 44, and from the heat exchangers through the heater 54 and a check valve 80 to the electrode stack 25. The stack 25 is energized from a reversible D.C. source and control circuit 18'.

This embodiment differs from those previously described principally in that electrolyte flows through the electrode stack 25 in one direction during the desalting process and flows through the stack in a reverse direction during the electrode regenerative process.

The raw electrolyte enters the stack at a suitable midpoint, whereby the contents of the stack at one end of the stack become enriched in salinity and the contents at the other end become depleted. In the present example, the low salinity fluid at the top of the stack is routed both to a product storage accumulator 82 and through a check valve 84 and the heat exchanger 42 to a product receiver 86. The high salinity fluid at the bottom of the stack is routed through a check valve 88 and the heat exchanger 44 to a waste receiver 90, and through a reversible pump 92 to a waste storage accumulator 94.

In the second half-cycle, the polarity of the D.C. source 18 is reversed and the direction of pumping action of the pump 92 is reversed. Thus, the flow of fluid through the stack is reversed. The fluid in the accumulators 82 and 94 passes back and forth between them during alternate half-cycles, with a portion of the fluid being directed to the receiver 86 and 90 and replaced by raw electrolyte from the feed line 40.

Although several embodiments of the invention have been shown and described, it is apparent that many modifications may be made without departing from the true spirit and scope of the invention.

What is claimed is:
1. Apparatus for demineralizing an electrolyte fluid comprising:
   a conduit forming a flow path for said fluids;
   a plurality of electrodes located in said flow path;
   a reversible polarity D.C. source of current having positive and negative sides;
   said positive and negative sides of said source being connected to alternate ones of said electrodes arranged in series in said fluid flow path and arranged electrically in parallel;
   one group of alternate electrodes comprising carbon in unconsolidated particle form to which has been applied a cation conducting material in fluid form which is polymerized to render said cation conducting material insoluble;
   the other group of alternate electrodes comprising carbon in unconsolidated particle form to which has been applied an anion conducting material in fluid form which is polymerized to render said anion conducting material insoluble;
   said electrodes being permeable to said fluid electrolyte flowing in said fluid path; and
   a porous separator permeable to said fluid and located between adjacent electrodes to insulate each electrode from its adjacent electrode.

2. An apparatus as defined in claim 1 wherein said porous separator comprises a porous ion conducting material.

3. An apparatus as defined in claim 2 wherein said porous separator is constructed of a polyelectrolyte resin.

4. An apparatus as defined in claim 1 having means for reversing the polarity of said D.C. source to regenerate said electrodes.

5. An apparatus as defined in claim 1 wherein said cation conducting material contains weak cations and said anion conducting material contains weak anions for buffering said electrodes against deleterious pH changes.

6. An apparatus as defined in claim 1 wherein each of said electrodes comprises a non-conductive wall having an exterior shape to fit the interior opening in said conduit; said wall being located between two of said separators to define with said separators a chamber for the ion responsive material of said electrode, and a conductor projecting through said wall into said material.

7. The apparatus defined by claim 1, further including a plurality of reservoirs, means for conducting output from said flow path to a selected one of said reservoirs, and means for conducting contents of a selected one of said reservoirs to said flow path.

8. The apparatus defined by claim 1, further including means for reversing flow of said electrolytic fluid through said flow path.

References Cited

UNITED STATES PATENTS

| 2,788,319 | 4/1957 | Pearson | 204—151 |
| 3,234,050 | 2/1966 | Beltzer et al. | 136—86 |
| 3,244,612 | 4/1966 | Murphy | 204—294 |

JOHN H. MACK, Primary Examiner

A. C. PRESCOTT, Assistant Examiner

U.S. Cl. X.R.

204—149, 180, 299

PO-1050
(5/69)

UNITED STATES PATENT OFFICE
CERTIFICATE OF CORRECTION

Patent No. 3,515,664      Dated June 2, 1967

Inventor(s) Allen M. Johnson and Richard F. Gillman

It is certified that error appears in the above-identified patent and that said Letters Patent are hereby corrected as shown below:

In the heading, Column 1, after the names and addresses of the inventors add the following:

--, assignors to The Marquardt Corporation, Van Nuys, California, a corporation of California.--

SIGNED AND SEALED
NOV 17 1970

NOV. 17, 1970

(SEAL)
Attest:

Edward M. Fletcher, Jr.
Attesting Officer

WILLIAM E. SCHUYLER, JR.
Commissioner of Patents